(12) United States Patent
Pala et al.

(10) Patent No.: US 9,372,538 B2
(45) Date of Patent: Jun. 21, 2016

(54) MULTIPLE-FORCE, DYNAMICALLY-ADJUSTED, 3-D TOUCH SURFACE WITH FEEDBACK FOR HUMAN MACHINE INTERFACE (HMI)

(71) Applicant: DENSO International America, Inc., Southfield, MI (US)

(72) Inventors: Silviu Pala, Birmingham, MI (US); Manabu Miyata, Novi, MI (US)

(73) Assignee: Denso International America, Inc., Southfield, MI (US)

( * ) Notice: Subject to any disclaimer, the term of this patent is extended or adjusted under 35 U.S.C. 154(b) by 406 days.

(21) Appl. No.: 13/630,283

(22) Filed: Sep. 28, 2012

(65) Prior Publication Data

US 2014/0092025 A1 Apr. 3, 2014

(51) Int. Cl.
| | |
|---|---|
| *G06F 3/048* | (2013.01) |
| *B60W 50/08* | (2012.01) |
| *G06F 3/01* | (2006.01) |
| *G06F 3/041* | (2006.01) |

(52) U.S. Cl.
CPC .............. *G06F 3/016* (2013.01); *G06F 3/0414* (2013.01); *G06F 2203/04105* (2013.01); *G06F 2203/04809* (2013.01)

(58) Field of Classification Search
CPC ................................ G06F 3/016; G06F 3/0414
USPC .................................. 345/206; 701/1; 715/702
See application file for complete search history.

(56) References Cited

U.S. PATENT DOCUMENTS

| | | | | |
|---|---|---|---|---|
| 8,154,227 | B1* | 4/2012 | Young et al. | 318/255 |
| 8,232,969 | B2* | 7/2012 | Grant et al. | 345/173 |
| 2006/0109256 | A1* | 5/2006 | Grant et al. | 345/173 |
| 2006/0161870 | A1* | 7/2006 | Hotelling et al. | 715/863 |
| 2006/0161871 | A1* | 7/2006 | Hotelling et al. | 715/863 |
| 2008/0027590 | A1* | 1/2008 | Phillips et al. | 701/2 |
| 2008/0122796 | A1* | 5/2008 | Jobs et al. | 345/173 |
| 2009/0244017 | A1* | 10/2009 | Pala et al. | 345/173 |
| 2009/0300531 | A1* | 12/2009 | Pryor | 715/764 |
| 2010/0127983 | A1* | 5/2010 | Irani et al. | 345/163 |
| 2010/0250071 | A1* | 9/2010 | Pala et al. | 701/48 |
| 2011/0032204 | A1* | 2/2011 | Pryor | 345/173 |
| 2011/0057899 | A1* | 3/2011 | Sleeman et al. | 345/174 |
| 2011/0082615 | A1* | 4/2011 | Small et al. | 701/29 |
| 2011/0082620 | A1* | 4/2011 | Small et al. | 701/29 |
| 2011/0106339 | A1* | 5/2011 | Phillips et al. | 701/2 |
| 2011/0267280 | A1* | 11/2011 | De Mers et al. | 345/173 |
| 2012/0032876 | A1* | 2/2012 | Tabe | 345/156 |
| 2012/0034954 | A1* | 2/2012 | Tabe | 455/566 |
| 2012/0086651 | A1* | 4/2012 | Kwon et al. | 345/173 |
| 2012/0092775 | A1* | 4/2012 | Duston et al. | 359/666 |
| 2012/0105358 | A1* | 5/2012 | Momeyer et al. | 345/174 |
| 2012/0174111 | A1* | 7/2012 | Pala et al. | 718/102 |
| 2013/0157729 | A1* | 6/2013 | Tabe | 455/573 |
| 2014/0113828 | A1* | 4/2014 | Gilbert et al. | 505/100 |

* cited by examiner

*Primary Examiner* — Michael J Eurice
(74) *Attorney, Agent, or Firm* — Harness, Dickey & Pierce, P.L.C.

(57) ABSTRACT

A control interface system for a vehicle includes an input module, a feedback module, and a system controller. The input module has a touchscreen and a control icon arranged thereon. The feedback module includes a pressure sensor in communication with the input module. The pressure sensor provides a sensor signal to the input module indicative of an applied force on the touchscreen. The system controller is in communication with the pressure sensor through the input module. The system controller provides at least one of a haptic feedback, an audible feedback, and a visual feedback, where the feedback is indicative of one of a selection mode, a slow change mode, and a fast change mode.

14 Claims, 7 Drawing Sheets

MULTIPLE-FORCE, DYNAMICALLY-ADJUSTED, 3-D TOUCH SURFACE WITH FEEDBACK FOR HUMAN MACHINE INTERFACE (HMI)

FIELD

The present disclosure relates to human machine interfaces and, more particularly, to an improved human machine interface having a multiple-force, dynamically-adjusted, 3-D touch surface with feedback.

BACKGROUND

The statements in this section merely provide background information related to the present disclosure and may not constitute prior art. Indicating instruments or gauges for viewing by drivers of vehicles generally include an analog portion for displaying and/or controlling vehicle operating conditions, such as the temperature of the interior cabin of a vehicle. In more recent vehicles, indicating instruments generally include a liquid crystal display (LCD) for displaying and/or controlling the vehicle operating conditions. An analog device typically includes a faceplate having indicia adjacent a scale to denote levels of the scale and a pointer for rotating to the indicia and scale numbers, such as mile per hour markings. While such analog and LCD devices have generally proven satisfactory for their intended purposes, they have been associated with their share of limitations.

One such limitation of current vehicles with analog and/or LCD devices relates to their safety. Because such analog and LCD devices are normally located in separate, side-by-side locations on a dash of a vehicle, a driver of the vehicle may have to remove his or her hands a far distance from a steering wheel of the vehicle to reach and adjust vehicle operating conditions. While adjusting the vehicle operating conditions on the analog and LCD devices, the driver may not be ready to make a sudden, emergency turn, for example.

Another limitation of current vehicles employing analog and/or LCD devices is related to their accuracy of use. To avoid accidents, the driver has to preferably adjust vehicle operating conditions on the analog and LCD devices while keeping his or her eyes on the road. Without being able to look at the analog and LCD devices, the driver may incorrectly adjust the vehicle operating conditions.

What is needed then is a device that does not suffer from the above disadvantages. This, in turn, will provide an LCD device that is safe for the driver to control. In addition, the LCD device should lead to accurate use even without having to see the LCD device.

SUMMARY

This section provides a general summary of the disclosure, and is not a comprehensive disclosure of its full scope or all of its features.

A control interface system for a vehicle includes an input module, a feedback module, and a system controller. The input module has a touchscreen and a control icon arranged thereon. The feedback module includes a pressure sensor in communication with the input module. The pressure sensor provides a sensor signal to the input module indicative of an applied force on the touchscreen. The system controller is in communication with the pressure sensor through the input module. The system controller provides at least one of a haptic feedback, an audible feedback, and a visual feedback, where the feedback is indicative of one of a selection mode, a slow change mode, and a fast change mode.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
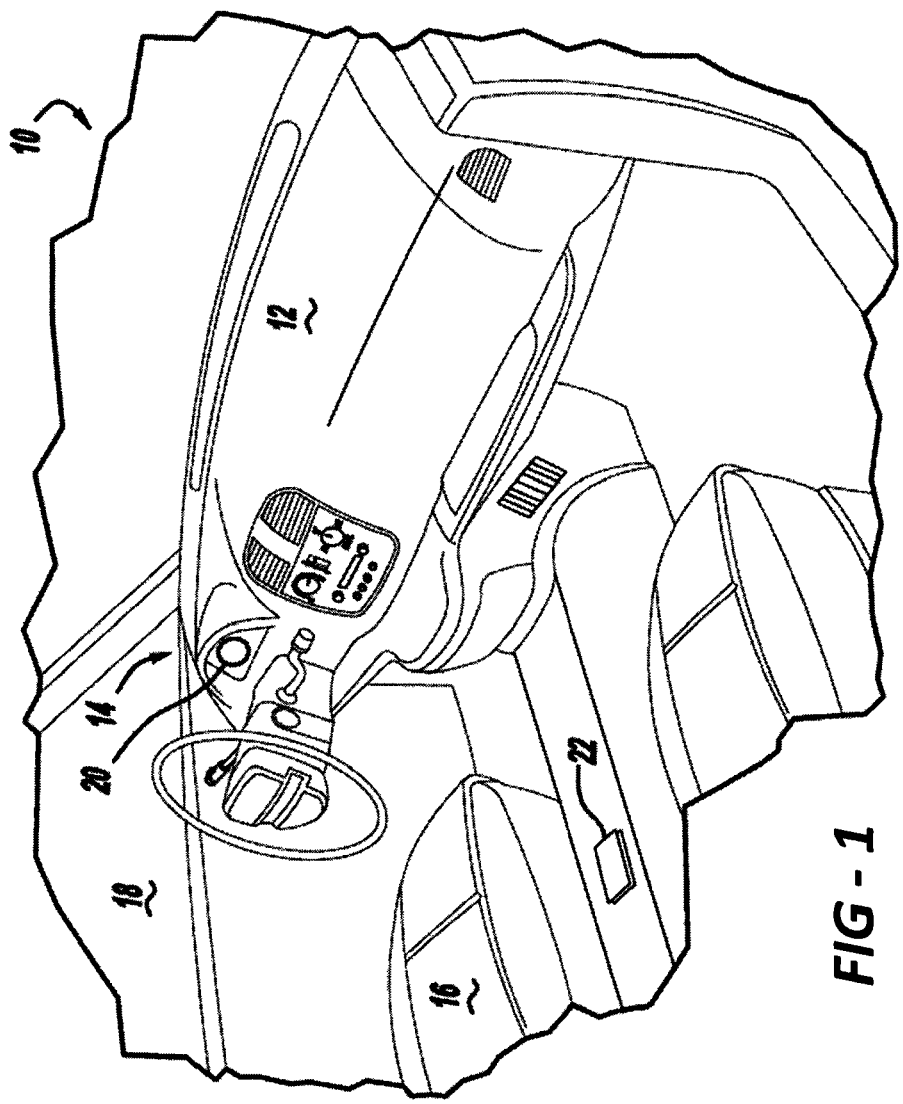
FIG. 1 is a perspective view of an interior cabin of a vehicle depicting a location of a display information center (DIC) and a haptic tracking remote.

Example embodiments will now be described more fully with reference to the accompanying drawings. The following description is merely exemplary in nature and is not intended to limit the present disclosure, application, or uses. It should be understood that throughout the drawings, corresponding reference numerals indicate like or corresponding parts and features. As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

With initial reference to FIG. 1, a vehicle 10 includes a dashboard 12 and an instrument panel 14, both of which may be situated in front of a seat 16 located in an interior cabin 18 of the vehicle 10. As part of the instrument panel 14, a display information center (DIC) 20 is depicted and may be exemplified by an indicating instrument or gauge, such as, but not limited to, a thermometer for the interior cabin 18. The DIC 20 may be connected to a haptic tracking remote 22 for controlling the DIC 20, as described herein.

Figure 2:
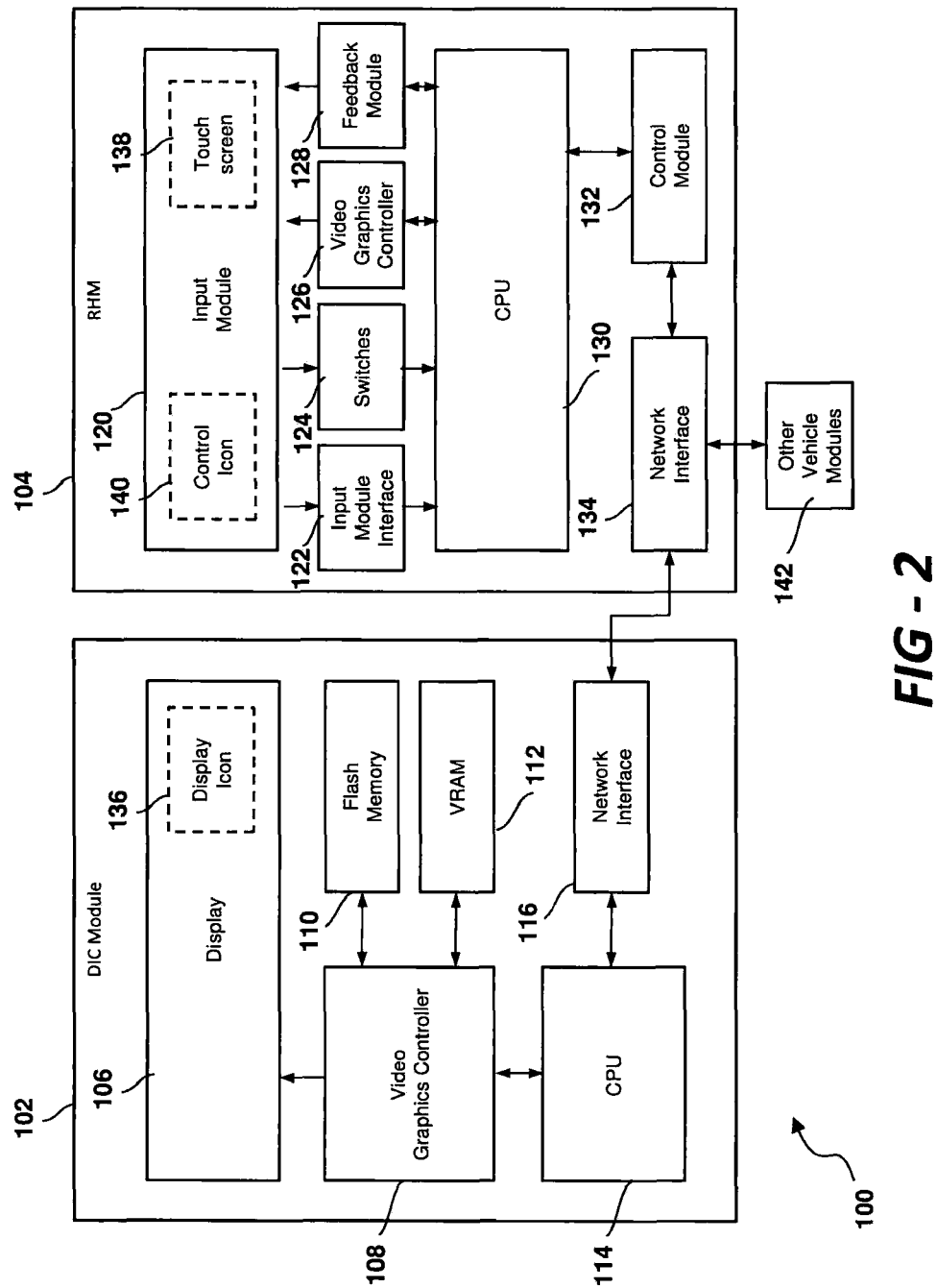
FIG. 2 is a functional block diagram of a control interface system that includes a DIC module of the DIC of FIG. 1 and a remote haptic module (RHM) of the haptic tracking remote of FIG. 1 in accordance with an embodiment of the present invention.

With reference now to FIG. 2, an exemplary control interface system 100 is shown. The control interface system 100 includes a DIC module 102 corresponding to the DIC 20 and a remote haptic module (RHM) 104 corresponding to the haptic tracking remote 22. The DIC module 102 may include a display 106, a video graphics controller 108, a flash memory 110, a video random access memory (VRAM) 112, a central processing unit (CPU) 114, and a network interface 116. The RHM 104 may include an input module 120, an input module interface 122, switches 124, a video graphics controller 126, a feedback module 128, a central processing unit (CPU) 130, a control module 132, and a network interface 134. Although depicted in the RHM 104, it should be noted that the control module 118 may be alternatively located in the DIC module 102 or in both the DIC module 102 and the RHM 104.

For example only, the display 106 may be a thin film transistor liquid crystal display (LCD). The display 106 may include at least one display icon 136 centered at coordinates (i.e., display icon coordinates) on the display 106 for displaying at least one value of the instrument panel 14 (e.g., vehicle cabin temperature). The data, image, and configuration of the display icon 136 may be predetermined and may reside in the flash memory 110 and be downloaded to the RHM 104, or vice versa (not shown). For example only, the data, image, and configuration of the display icon 136 may be in one of different geometric shapes. In addition, the data, image, and configuration of the display icon 136 may be customized by the operator via a graphical user interface.

The video graphics controller 108 and the VRAM 112 generate and output images of the display icon 136, the display value, other data of the vehicle 10, and/or the graphical user interface to the display 106. As should be understood, the display icon 136 may have a predetermined data, image, and configuration provided by the manufacturer and residing in the flash memory 110. Alternatively, the data, image, and configuration of the display icon 136 may be created by the operator in vehicle 10 or on a website downloadable to the RHM 104 or the DIC module 102. The selected image settings may also be stored in local memory (not shown). Furthermore, the CPU 114 receives and processes display signals from the network interface 116. The video graphics controller 108 and the VRAM 112 receive the processed display signals in order to generate and output images and values of the display icon 136 to the display 106.

The input module 120 may include a touchpad or a touchscreen 138 having a thin film transistor liquid crystal display (LCD). At least one control icon 140 may be arranged (e.g., control icon coordinates) on the input module 120. In one example, an operator of the vehicle 10 may manipulate the at least one control icon 140 to control both the DIC module 102 and at least one vehicle module 142 (e.g., vehicle cabin temperature) through the network interface 134. The data, image, and configuration of the control icon 140 may be predetermined and may reside in the flash memory 110 to be downloaded to the RHM 104, or vice versa (not shown).

For example only, the image and configuration of the control icon 140 may be in one of different geometric shapes (e.g., upwardly or downwardly pointed triangular shape). In addition, the image (e.g., color) and configuration (e.g., shape) of the control icon 140 may be customized by the operator via a graphical user interface (not shown). As should be understood, the control icon 140 may have a predetermined data, image, and configuration provided by the manufacturer. Alternatively, the data, image, and configuration of the control icon 140 may be created by the operator in vehicle 10 or on a website downloadable to the RHM 104 or the DIC module 102. The selected image settings may be stored in local memory (not shown).

Figure 3:
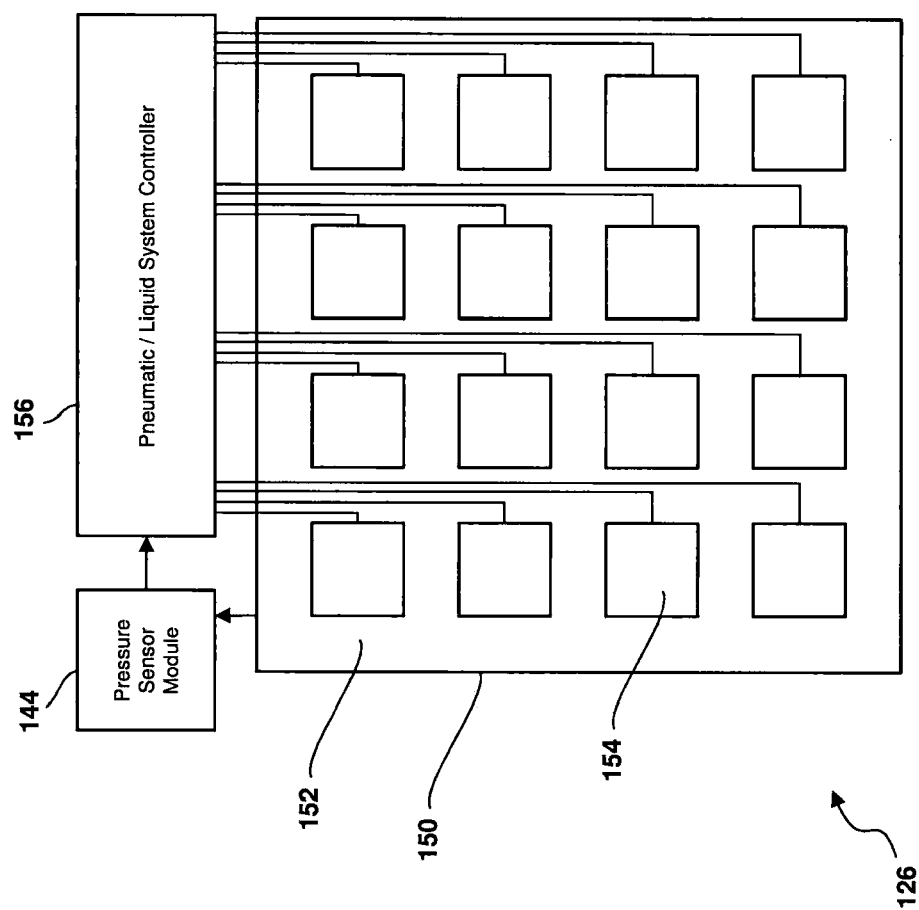
FIG. 3 is a functional block diagram of an input module of the remote haptic module of FIG. 2.

The input module interface 122 may be used to detect the occurrence of an applied force, a location of the applied force, and a degree of force on a surface of the input module 120. To detect the applied force, the input module interface 122 may communicate with a pressure sensor module 144 (FIG. 3).

The pressure sensor module 144 may generate a sensor signal based on the detection of an applied force, the detected applied force location, and a detected level of applied force (e.g., time and pressure of force) and transmit the sensor signal to the input module interface 122. The CPU 130 then receives the sensor signal and processes the sensor signal.

The switches 124 may be used to actuate the RHM 104 when the degree of applied force provided to the input module interface 122 exceeds a predetermined level. When the input module interface 122 detects that the applied force is greater than the predetermined level, the input module 120 toggles the switches 124 to connect or disconnect a circuit between a voltage source and the CPU 130. The voltage source may be located within the input module 120 for generating a sensor signal that indicates the degree of applied force.

The video graphics controller 126 may generate and output images and values of the control icon 140, other data of the vehicle 10, and/or a graphical user interface to the input module 120. The images may be predetermined and may reside in the flash memory 110 and be downloaded to the RHM 104, or vice versa (not shown). In addition, the images may be customized by the driver via the graphical user interface. The driver's image settings may be stored in local memory. Furthermore, the surface of the input module 120 may be mapped onto the surface of the display 106 as described in U.S. patent application Ser. No. 12/079,871, which is incorporated in its entirety herein. In other words, the surface of the display 106 is a virtual image of the surface of the input module 120 with the control icon 140 mapped into the display icon 136.

Figure 4:
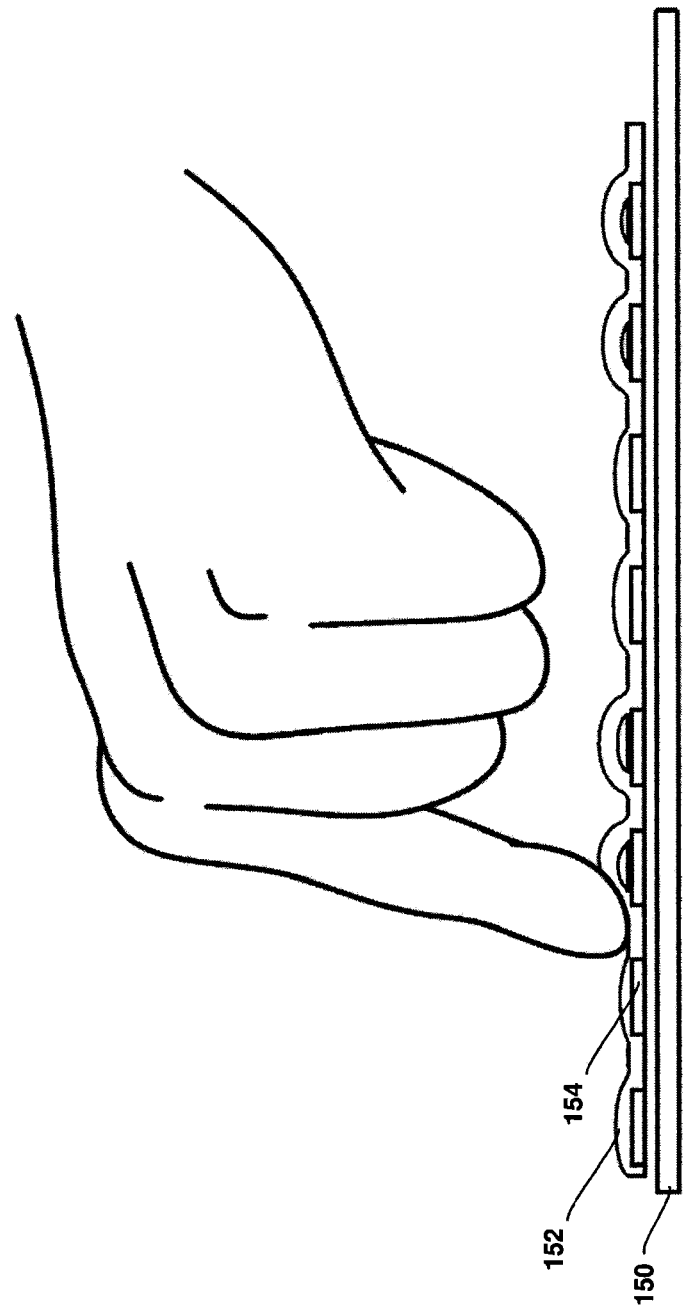
FIG. 4 is a side view of the input module of FIG. 3.

With reference now to FIGS. 3 and 4, the feedback module 128 may include a multi-modal interface providing visual, acoustic, touch, and haptic feedback to the operator. In particular, the feedback module 128 may interact with the touchscreen 138 to display the control icon 140 for providing visual feedback. Furthermore, an audio module (not shown) may provide audio feedback, such as an audible beep corresponding to the command of the control icon 140, to the driver when the feedback module 128 receives the processed feedback signal. In order to provide the touch and/or haptic feedback, the feedback module 128 may be a device capable of receiving and transmitting tactile feedback to the operator, as will be described in more detail below. The feedback module 128 may provide haptic, visual, and/or audio feedback in any combination. Furthermore, the driver's feedback settings may be stored in local memory and/or downloaded to the DIC module 102.

In one example, the feedback module 128 may include a tectonic dynamic touch surface 150 (x-y-z coordinate) combined with a reconfigurable flexible display 152 (OLED). A plurality of inflatable cells 154 (e.g., small bubbles filled with a liquid/air) may be arranged between the touch surface 150 and the display 152. The inflatable cells 154 may be in communication with a pneumatic/liquid system controller 156 for controlling the amount of air/liquid in each cell 154. Each inflatable cell 154 may be pre-configured by the manufacturer or may be dynamically configured during the touch event so as to provide alternate configurations for blind operation of the touch surface 150. Accordingly, the inflatable cells 154 may increase or decrease contact pressure based on data from the pneumatic/liquid system controller 156.

Figure 5:
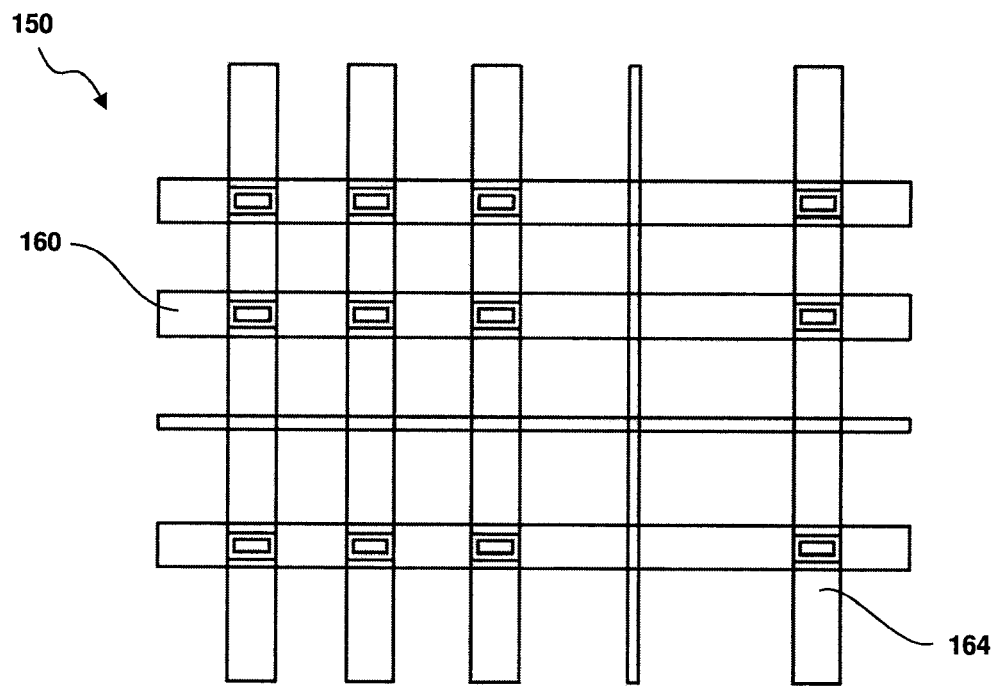
FIG. 5 is a perspective view of a unit layer of an electroactive polymer of the input module of FIG. 3.
Figure 6:
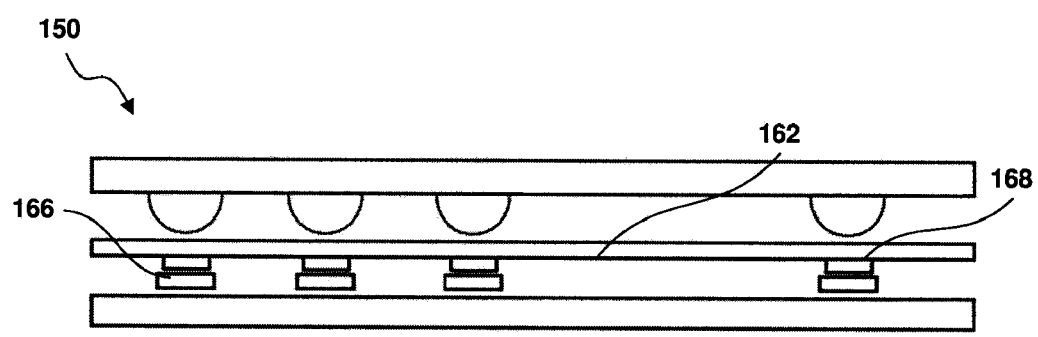
FIG. 6 is a side view of the unit layer of an electroactive polymer of FIG. 5.

With reference now to FIGS. 5 and 6, an example of the dynamic touch surface 150 is shown. The dynamic touch surface 150 may be made of an electroactive polymer (EAP) that is a high-molecule material deformable by electrical stimuli so as to be deformed locally at areas where driving voltages are applied to form an electric field. The dynamic touch surface 150 includes a plurality of thin polymer bands 160 having x-electrodes 162 printed thereon for sensing in the x-direction and a plurality of thin polymer bands 164 having y-electrodes 166 printed thereon for sensing in the y-direction. The polymer bands 160, 164 are alternately stacked with a driving electrode (e.g., resistive tens metric gauges 168) arranged at the interface between the x-bands 160 and the y-bands 164. In this way, the touch surface 150 provides a physical structure that may be deformed when protruded or depressed locally at areas to which driving voltages have been applied so as to provide a signal to the pressure sensor module 144. Since the touch surface 150 is formed by stacking the x-bands 160 and the y-bands 164, the gauges 168 are defined in a matrix form at the intersections of the x-bands 160 and the y-bands 164. When the gauges 168 are individually driven, the touch surface 150 may be deformed to display a shape, such as a letter, a figure, a simple symbol, etc. It should be understood that while the dynamic touch surface 150 is described as being an EAP material providing both input and feedback, it may also be a piezo (input and feedback) or a pressure sensor (input only).

Figure 7:
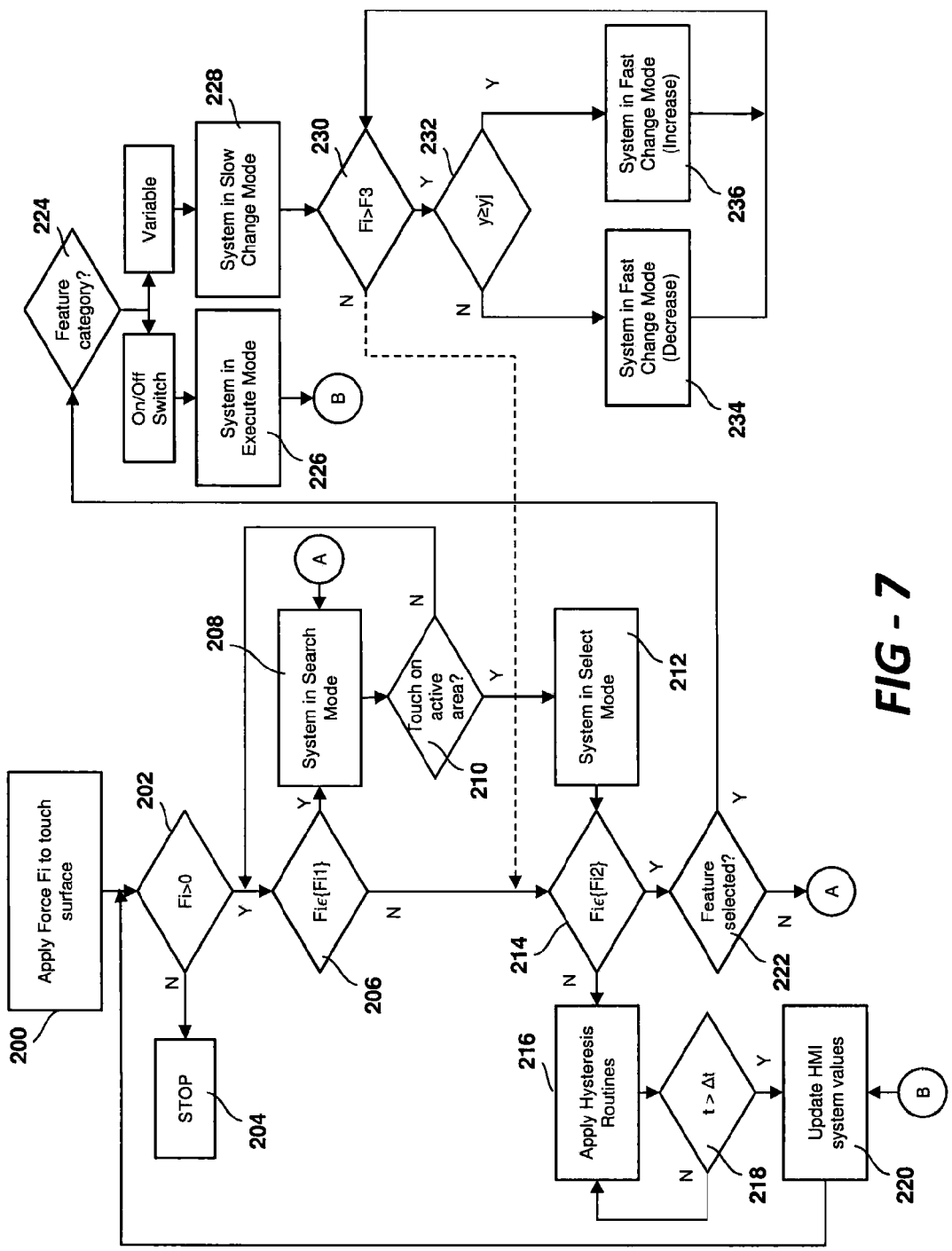
FIG. 7 is a flowchart depicting exemplary steps performed by a control module of the control interface system of FIG. 2 in accordance with an embodiment of the present invention.
Figure 8:
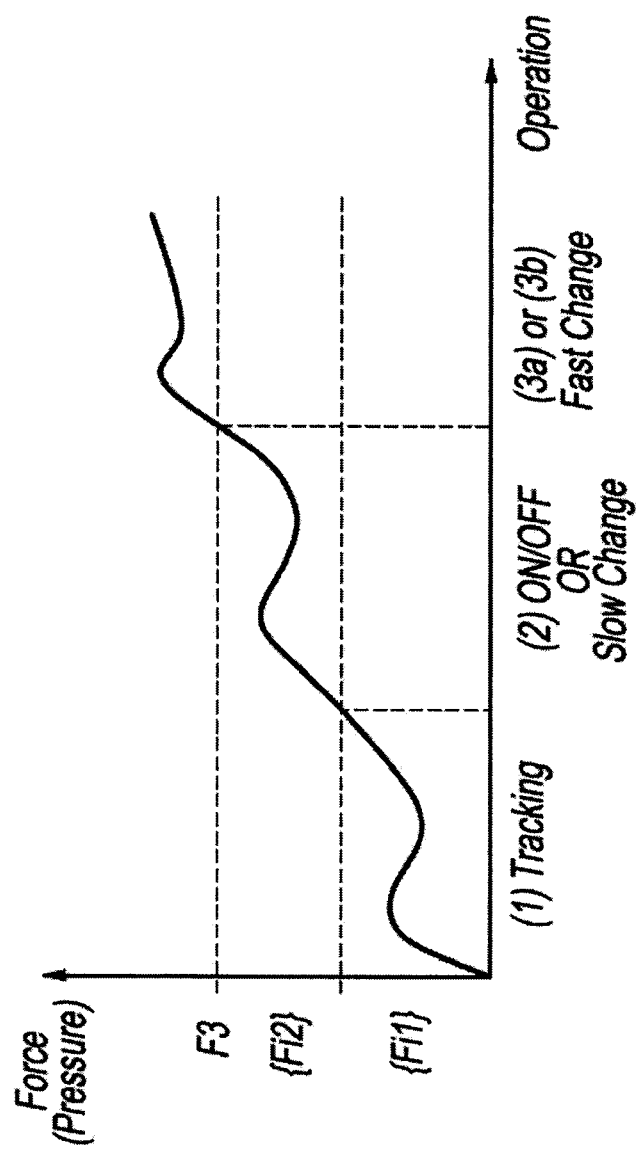
FIG. 8 is a graph depicting an applied force over a time for a force sensor of the input module interface of FIG. 2.

In one example of use shown in FIG. 7, the vehicle operator may set, increase, or decrease a value of the instrument panel 14, such as a temperature of the interior cabin 18. The operator may increase or decrease the value at either a slow or accelerated speed. As shown at block 200, an applied force/pressure by the vehicle operator (e.g., Fi) is provided to the touch surface 150 and sensed by the pressure sensor module 144. The control module 132 receives the processed sensor signal from the CPU 130 and determines the applied force based on the processed sensor signal. The input module 120 may receive the sensor signal (e.g., Fi>0), at block 202. If the force (Fi) is not greater than zero, the algorithm is stopped at block 204. However, if the force (Fi) is greater than zero, the algorithm proceeds to block 206, where the force (Fi) is evaluated to determine if it falls within a predetermined subset of values corresponding to a force range [Fi1] for tracking a finger position. A graphical representation of this predetermined subset of values is shown in FIG. 8.

If the force (Fi) is within the tracking range [Fi1], the system is determined to be in SEARCH mode (block 208). In SEARCH mode, 1) the vehicle operator is provided with initial control icons 140 on the touchscreen 138; 2) the CPU 130 determines a position (X0,Y0) of force (Fi) on the touchscreen 138; 3) a virtual image of the position (X0, Y0) is displayed on the DIC 20; and 4) movement from (X0,Y0) to (X, Y) is tracked and displayed on the DIC 20.

The (X,Y) position is monitored to verify that it remains in the active area on the touchscreen 138 (block 210). If the (X, Y) position moves out of the active area, the algorithm restarts at block 206. If, however, the (X, Y) position remains in the active area, the system is deemed to be in the SELECT MODE (block 212). In SELECT mode, 1) the (X,Y) position is evaluated for correspondence with a selected control feature (j); 2) a feedback mechanism (e.g., haptic feedback, audible feedback) corresponding to the selected control feature (j) is activated; and 3) a virtual image on the DIC 20 is changed to "Selected feature (j)". The control module 132 determines the display signal based on the mode and the virtual touch area. When the mode is the search mode, the display signal commands the DIC module 102 to display the image of the virtual touch area along with the images of the display icons 136, the display values, and the graphical user interface. In other words, the driver's touch on the surface of the input module 120 is tracked, or indicated, on the display 106.

The control module 118 determines a feedback signal based on the mode and the touch coordinates to provide feedback to the driver to indicate that the control icon has been touched with at least the minimum force. For example only, the intensity of the feedback may change depending on the mode and the control icon the driver touches. The central processing unit 130 receives and processes the feedback signal. The feedback module 126 receives the processed feedback signal. The control module 132 determines the display signal based on the mode, the touch coordinates, and the virtual touch area to change the virtual image to indicate to the driver that the control icon has been touched with at least the minimum force. For example only, the images of the selected display icon and/or the virtual touch area may change in color and/or animation depending on the mode and the control icon the driver touches. When the mode is the select mode, the display signal commands the DIC module 102 to display the changed images of the selected display icon and/or the virtual touch area along with images of any other display icons, the display values, and the graphical user interface.

The force (Fi) is next evaluated at block 214 to determine if it falls within a second predetermined subset of values [Fi2] corresponding to a force range to activate a control (e.g., turn a feature on/off, increase/decrease value of feature). A graphical representation of this predetermined subset of values is shown in FIG. 8. As can be seen, this subset of values is provided at a larger force/pressure than that for tracking the finger position. If the force (Fi) is not within this second predetermined subset of values, a hysteresis routine is run at block 216. If the hysteresis routines determine the force (Fi) is out of predetermined ranges, and (X, Y) position does not change for a predetermined time (t), then the last determined status is maintained. If time (t) is greater than the predetermined time, then a NO CHANGE message is displayed and the algorithm is stopped. If, however, the hysteresis routines determine the force (Fi) is out of predetermined ranges, and (X, Y) position does change, then a SEARCH MODE is initiated. A timing module (block 218) includes a timer that begins to increment when the timing module is started. When an appropriate hysteresis time has passed, the HMI system values are updated at block 220 and the algorithm is restarted.

If the force (Fi) falls within this second predetermined subset of values, a feature selection is verified (block 222). If the feature is not selected, the system remains in the SEARCH mode (block 208). If, however, the feature is selected, a feature category is verified to determine if the selected feature is an on/off type switch or a variable switch (block 224). If the feature category is determined to be an on/off type switch, the system moves to an ON/OFF EXECUTE MODE (block 226). In the ON/OFF EXECUTE MODE, 1) the selected feature is executed (e.g., turned ON or turned OFF); 2) a feedback mechanism (e.g., haptic feedback, audible feedback) corresponding to the executed control feature (j) is activated; and 3) a virtual image on the DIC 20 is changed to "Executed feature (j)". The algorithm then continues to block 220 to update the HMI system values.

If the feature category is determined to be a variable switch, the system moves to a SLOW CHANGE MODE (block 228). In the SLOW CHANGE MODE, 1) the selected feature is increased or decreased based on a timer module (e.g., increased or decreased at a constant rate); 2) a feedback mechanism (e.g., haptic feedback, audible feedback) corresponding to the slow change of the control feature (j) is activated; and 3) a virtual image on the DIC 20 is changed to "Slow change feature (j)". The algorithm then continues to block 230 to determine if the force (Fi) exceeds a third force level (F3) corresponding to a force range for increasing/decreasing a selected value based on force and position variation.

If the force (Fi) is below the third force level (F3), the algorithm returns to block 214 where the incremental increase/decrease is maintained. If, however, the force (Fi) is greater than the third force level (F3), a y-position is evaluated to determine if the feature is in an increase or decrease mode (block 232). Block 234 corresponds to a FAST CHANGE (DECREASE) MODE, where 1) the selected feature is decreased based on a determination of force and position variation; 2) a feedback mechanism (e.g., haptic feedback, audible feedback) corresponding to the fast change of the control feature (j) is activated; and 3) a virtual image on the DIC 20 is changed to "Fast change feature (j) decrease". Likewise, block 236 corresponds to a FAST CHANGE (INCREASE) MODE, where 1) the selected feature is increased based on a determination of force and position variation; 2) a feedback mechanism (e.g., haptic feedback, audible feedback) corresponding to the fast change of the control feature (j) is activated; and 3) a virtual image on the DIC 20 is changed to "Fast change feature (j) increase".

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A control interface system for a vehicle comprising:
a touchscreen and a selectable control icon arranged thereon, the touchscreen is a vehicle touchscreen and the control icon is configured for setting a target cabin temperature;
a pressure sensor configured to generate a sensor signal indicative of an applied force on the touchscreen; and
a system controller in communication with the pressure sensor to receive the sensor signal, wherein the system controller provides at least one of a haptic feedback, an audible feedback, and a visual feedback, wherein the feedback is indicative of one of a search mode, a selection mode, a slow change mode in which controlled features change slow, and a fast change mode in which controlled features change fast;
wherein:
the system controller provides feedback indicative of the search mode when the applied force is within a first predetermined force level range that is a tracking range, and the system controller displays on the touchscreen an image opposite to the applied force and moves the image about the touch screen to track movement of the applied force about the touch screen;
the system controller enters a target cabin temperature change mode when the applied force is within an active area of the display screen and within the first predetermined force level range, the target cabin temperature is not changed unless the applied force is greater than the first predetermined force level range;
the system controller provides the feedback indicative of the slow change mode when the applied force is greater than the first predetermined force level range and less than a second predetermined force level range, and changes the target cabin temperature at a first rate of speed;
the system controller provides the feedback indicative of the fast change mode when the applied force is greater than the second predetermined force level range and within a third predetermined force level range, and changes the target cabin temperature at a second rate of speed that is greater than the first rate of speed; and
the first predetermined force level range is less than the second predetermined force level range and the second predetermined force level range is less than the third predetermined force level range.

2. The control interface system of claim 1, wherein the pressure sensor further includes a plurality of inflatable cells in communication with the system controller for providing the haptic feedback.

3. The control interface system of claim 1, wherein a display is in communication with the system controller, the display providing indicia corresponds to the target cabin temperature change mode of the selected control icon when the system controller is in the selection mode.

4. The control interface system of claim 1, wherein the touchscreen includes at least one imbedded switch operable to generate the sensor signal upon actuation thereof.

5. The control interface system of claim 1, wherein the touchscreen is an electroactive polymer.

6. A method for controlling a function comprising:
depressing an inflatable cell on a touchscreen to generate depression force, the touchscreen is a vehicle touchscreen;
sending a sensor signal indicative of the depression force and position thereof on the touchscreen to a system controller;
evaluating the sensor signal;
determining if the depression force is within an active area of the touchscreen displaying control icons, including a control icon for setting a target cabin temperature;
determining if the sensor signal is within a first predetermined force range;
determining if the sensor signal is within a second predetermined force range greater than the first predetermined force range;
determining if the sensor signal is within a third predetermined force range greater than the second predetermined force range;
activating a search mode of a search module if the sensor signal is within the first predetermined force range, in the search mode: (1) the control icons are displayed on the touchscreen, (2) the position of the depression force on the touch screen is determined by the system controller, (3) an image is displayed on the touch screen opposite to the depression force, the image moves along the touch screen to follow the depression force, and (4) movement of the depression force is tracked and displayed along the touchscreen;
activating a selection mode of a selection module subsequent to activation of the search mode if position of the depression force remains in the active area of the touch screen and the sensor signal is within the first predetermined force range, in the selection mode: (1) position of the depression force relative to the control icons is determined to identify selection of the control icon for setting the target cabin temperature, (2) feedback is generated corresponding to selection of the control icon for setting the target cabin temperature, and (3) the target cabin temperature is not changed unless the sensor signal is in the second or third predetermined force ranges;

activating a slow change mode of a slow change module if the sensor signal is within the second predetermined force range, in the second predetermined force range the target cabin temperature is changed at a first rate of speed; and activating a fast change mode of a fast change module if the sensor signal is within the third predetermined force range, in the third predetermined force range functionality controlled by the target cabin temperature is changed at a second rate of speed that is greater than the first rate of speed.

7. The method of claim 6, further comprising:

at least one imbedded switch operable to generate the sensor signal upon actuation thereof.

8. The method of claim 6, wherein the touchscreen is an electroactive polymer.

9. The method of claim 6, further comprising:

providing feedback indicative of the slow change mode when the applied force is within the second predetermined force range.

10. The method of claim 9, further comprising:

providing feedback indicative of the fast change mode when the applied force is within the third predetermined force range.

11. The method of claim 6, wherein the inflatable cell is in communication with the system controller for inflating the inflatable cell to provide a haptic feedback.

12. The method of claim 11, wherein a display and an audio system are in communication with the system controller, the display and audio providing an indicia of a selected control icon.

13. A method for controlling vehicle functions comprising:

identifying location and force of a touch on a touchscreen relative to icons displayed on the touchscreen when the force is in a first predetermined range of force, each icon is associated with a function available for control, the touchscreen is a vehicle touchscreen and the icons are configured for control of vehicle functions including cabin temperature setting;

displaying and tracking on the touchscreen the location of the touch as the touch moves along the touchscreen and is in the first predetermined range;

identifying a touched icon on the touchscreen as a control icon for setting a target cabin temperature when the force of the touch is in the first predetermined range, and not modifying the functionality associated with the selected icon unless the force of the touch exceeds the first predetermined range;

modifying the target cabin temperature at a first rate of speed when the force of the touch is in a second predetermined range greater than the first predetermined range and less than a third predetermined range; and modifying the target cabin temperature at a second rate of speed that is greater than the first rate of speed when the force of the touch is in the third predetermined range greater than the second predetermined range.

14. The method of claim 13, further comprising generating at least one of haptic feedback and audible feedback when modifying the target cabin temperature.

\* \* \* \* \*